US012694839B2

(12) United States Patent
Kim et al.

(10) Patent No.: US 12,694,839 B2
(45) Date of Patent: Jul. 28, 2026

(54) SOURCE DRIVER INTEGRATED CIRCUIT AND DISPLAY DRIVING DEVICE INCLUDING THE SAME

(71) Applicant: LX SEMICON CO., LTD., Daejeon (KR)

(72) Inventors: Youngbok Kim, Daejeon (KR); Sumin Yang, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 18/947,134

(22) Filed: Nov. 14, 2024

(65) Prior Publication Data

US 2025/0157416 A1 May 15, 2025

(30) Foreign Application Priority Data

Nov. 15, 2023 (KR) ........................ 10-2023-0158448
Nov. 5, 2024 (KR) ........................ 10-2024-0155426

(51) Int. Cl.
*G09G 3/3275* (2016.01)
*G09G 3/36* (2006.01)

(52) U.S. Cl.
CPC ......... *G09G 3/3275* (2013.01); *G09G 3/3688* (2013.01); *G09G 2330/028* (2013.01)

(58) Field of Classification Search
None
See application file for complete search history.

(56) References Cited

U.S. PATENT DOCUMENTS 6,456,353 B1 * 9/2002 Chen ................... G02F 1/13452 349/149
9,240,160 B2 1/2016 Wang et al.
2004/0104903 A1 * 6/2004 You ...................... G09G 3/3611 345/204
2005/0147178 A1 * 7/2005 Kikuchi .............. H04L 25/4917 375/288

(Continued)

FOREIGN PATENT DOCUMENTS

KR 20040013752 A 2/2004
KR 100855502 B1 9/2008

(Continued)

*Primary Examiner* — Kirk W Hermann
(74) *Attorney, Agent, or Firm* — ROTHWELL, FIGG, ERNST & MANBECK, P.C.

(57) ABSTRACT

A display driving device includes a timing controller configured to output an input data packet including image data and source control data, a plurality of source driver integrated circuits connected to the timing controller in a point-to-point type through first and second data wires to receive the input data packet, and configured to generate a termination voltage using a reference voltage and a first power supply voltage to output the termination voltage through a termination voltage output port, a plurality of termination resistor circuits configured to connect the first and second data wires of each of the source driver ICs, and a termination voltage equalization wire configured to electrically connect termination voltage output ports of the plurality of source driver integrated circuits to equalize the termination voltage generated by each of the source driver integrated circuits and apply the equalized termination voltage to each of the termination resistor circuits.

11 Claims, 6 Drawing Sheets

(56) References Cited

U.S. PATENT DOCUMENTS

| | | | | |
|---|---|---|---|---|
| 2010/0156885 | A1* | 6/2010 | Cho | G09G 3/3666 345/87 |
| 2015/0154943 | A1* | 6/2015 | Lee | G09G 5/006 345/204 |
| 2021/0398470 | A1* | 12/2021 | Kim | G09G 3/20 |
| 2023/0081076 | A1* | 3/2023 | Lim | G09G 3/3688 345/212 |

FOREIGN PATENT DOCUMENTS

| | | | | |
|---|---|---|---|---|
| KR | 20110072140 | A | | 6/2011 |
| KR | 101761417 | B1 | * | 7/2017 |
| KR | 101782641 | B1 | * | 10/2017 |
| KR | 20210156982 | A | | 12/2021 |

* cited by examiner

SOURCE DRIVER INTEGRATED CIRCUIT AND DISPLAY DRIVING DEVICE INCLUDING THE SAME

CROSS-REFERENCE TO RELATED APPLICATIONS

This application claims the benefit of the Korean Patent Applications No. 10-2023-0158448 filed on Nov. 15, 2023 and No 10-2024-0155426 field on Nov. 5, 2024, which are hereby incorporated by reference in their entirety as if fully set forth herein.

BACKGROUND

Field of Disclosure

The present disclosure relates to a display driving device. In more detail, the present disclosure relates to a source driver Integrated Circuit (IC).

Description of Background

In a display driving device, image data can be transmitted and received using a Current Mode Logic (CML) driver. More specifically, in a display driving device 100 based on a current mode logic driver as illustrated in FIG. 1, a transmitting-side comparator TX provided in a timing controller 110 and a receiving-side comparator RX provided in a source driver IC 120 are connected to each other through a wire pair 130 and 140, termination resistors R1 and R2 are connected at an input terminal of the receiving-side comparator RX, and a termination voltage Vterm is supplied to the termination resistors R1 and R2.

The termination voltage Vterm is supplied from a power supply (e.g., Power Management Integrated Circuit: PMIC). The termination voltage Vterm is supplied to the source driver IC 120 through a Printed Circuit Board (PCB) and a Flat Flexible Cable (FFC).

However, as illustrated in FIG. 2, in a general display driving device in which termination voltages Vterm1 to Vtermn are supplied from the power supply 200, a voltage drop (IR Drop) can occur due to the driving current each time the source drive ICs 120*a* to 120*n* are passed through. Therefore, since the source driver IC 120*n* located far from the power supply 200 has no choice but to operate at a low termination voltage Vtermn, there is a problem that image defects can occur.

SUMMARY

The present disclosure is directed to providing a source driver integrated circuit and a display driving device including the same that substantially obviates one or more problems due to limitations and disadvantages of the related art.

An aspect of the present disclosure is directed to providing a source driver integrated circuit and a display driving device including the same that are capable of preventing the occurrence of a voltage drop in termination voltage.

Another aspect of the present disclosure is directed to providing a source driver integrated circuit and a display driving device including the same in which each source driver integrated circuit can operate with a uniform termination voltage.

In one aspect, a display driving device includes a timing controller configured to output an input data packet including image data and source control data, a plurality of source driver integrated circuits configured to be connected to the timing controller in a point-to-point type through first data wire and second data wire to receive the input data packet, configured to generate a termination voltage using a reference voltage and a first power supply voltage to output the termination voltage through a termination voltage output port, respectively, a plurality of termination resistor circuits configured to connect the first data wire and the second data wire of each of the source driver ICs to each other, and a termination voltage equalization wire configured to electrically connect termination voltage output ports of the plurality of source driver integrated circuits to each other to equalize the termination voltage generated by each of the source driver integrated circuits and apply the equalized termination voltage to each of the termination resistor circuits.

In another aspect, a source driver integrated circuit includes a receiving-side comparator configured to receive an input data packet including image data and source control data from a transmitting-side comparator via a first data wire and a second data wire, a termination voltage generation circuit configured to generate a termination voltage using a reference voltage and a first power supply voltage, and a termination voltage output port configured to output the termination voltage to a termination resistance circuit connected to the first data wire and the second data wire.

Additional advantages and features of the disclosure will be set forth in part in the description which follows and in part will become apparent to those having ordinary skill in the art upon examination of the following or may be learned from practice of the disclosure. Other benefits of the disclosure may be realized and attained by the structure particularly pointed out in the written description and claims hereof as well as the appended drawings.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION

Figure 1:
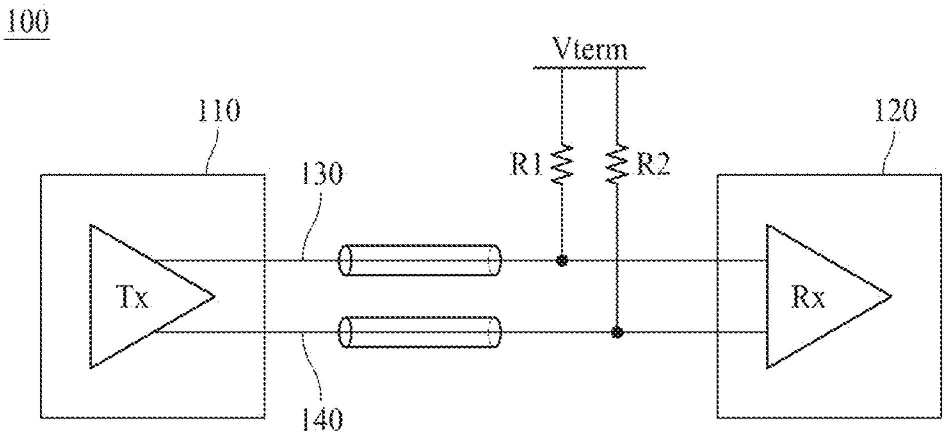
FIG. 1 schematically illustrates the configuration of a display driving device based on a current mode logic driver.
Figure 2:
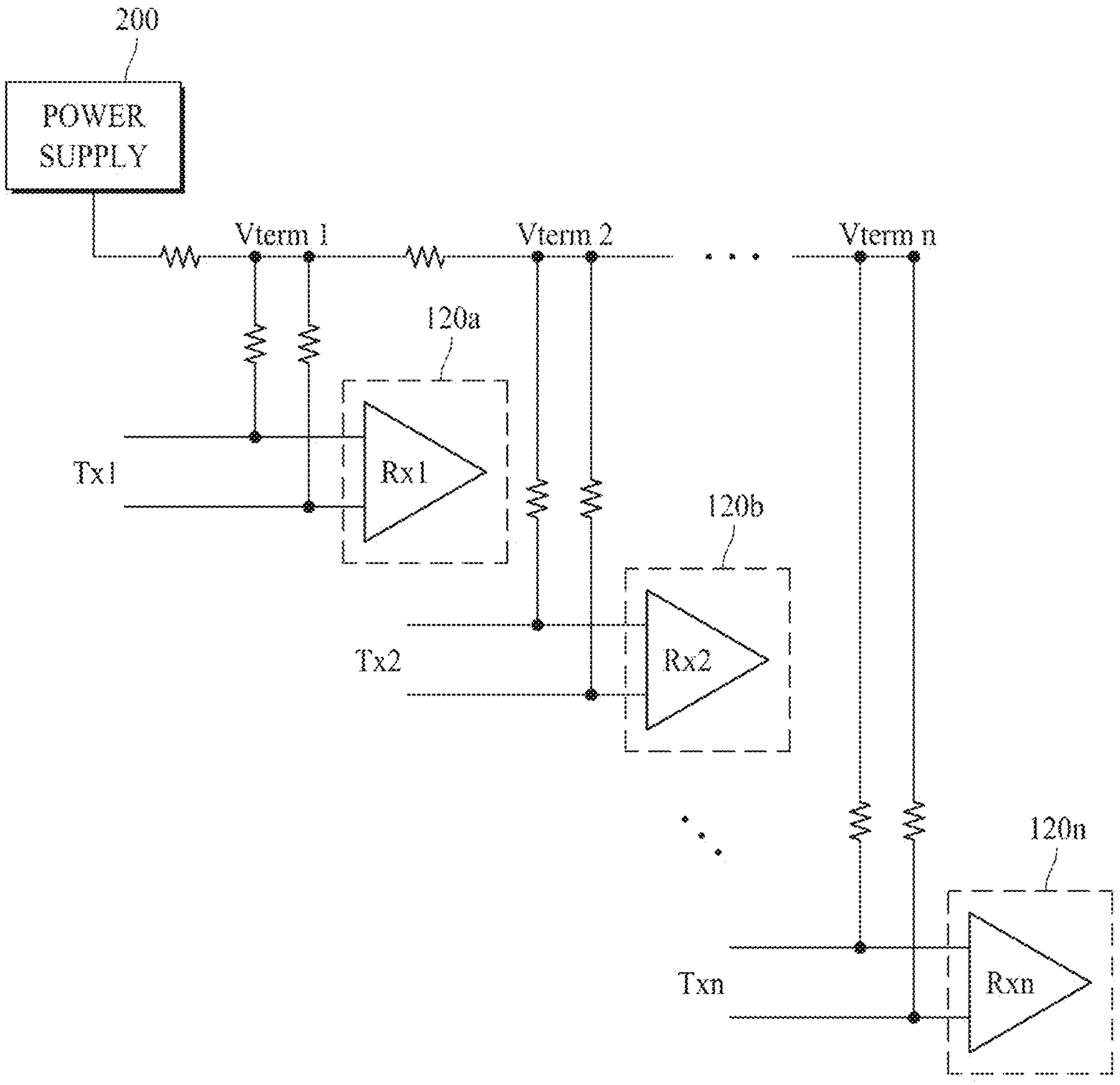
FIG. 2 schematically illustrates the occurrence of a voltage drop in a termination voltage when a termination voltage is supplied from a power supply.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Furthermore, the present disclosure is only defined by scopes of claims.

Throughout the drawings and the detailed description, unless otherwise described, the same drawing reference numerals should be understood to refer to the same elements, features, and structures. In the following description, when a detailed description of well-known methods, functions, structures or configurations may unnecessarily obscure aspects of the present disclosure, the detailed description thereof may have been omitted for brevity. Further, repetitive descriptions may be omitted for brevity.

When the term "comprise," "have," "include," "contain," "constitute," "made of," "formed of," "composed of," or the like is used with respect to one or more elements (e.g., layers, films, regions, components, sections, members, parts, regions, areas, portions, steps, operations, and/or the like), one or more other elements may be added unless a term such as "only" or the like is used. The terms used in the present disclosure are merely used in order to describe particular example embodiments, and are not intended to limit the scope of the present disclosure. The terms of a singular form may include plural forms unless the context clearly indicates otherwise. The word "exemplary" is used to mean serving as an example or illustration. Embodiments are example embodiments. Aspects are example aspects. In one or more implementations, "embodiments," "examples," "aspects," and the like should not be construed to be preferred or advantageous over other implementations. An embodiment, an example, an example embodiment, an aspect, or the like may refer to one or more embodiments, one or more examples, one or more example embodiments, one or more aspects, or the like, unless stated otherwise. Further, the term "may" encompasses all the meanings of the term "can."

In construing an element, the element is construed as including an error range although there is no explicit description.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

For the expression that an element (e.g., layer, film, region, component, section, member, part, region, area, portion, or the like) is "connected," "coupled," "attached," "adhered," "linked," or the like to another element, the element can not only be directly connected, coupled, attached, adhered, linked, or the like to another element, but also be indirectly connected, coupled, attached, adhered, linked, or the like to another element with one or more intervening.

Features of various embodiments of the present disclosure may be partially or totally coupled to or combined with each other, and may be variously inter-operated and driven technically. The embodiments of the present disclosure may be carried out independently from each other or may be carried out together with a co-dependent relationship.

A shape, a size, a ratio, an angle, and a number disclosed in the drawings for describing embodiments of the present disclosure are merely an example, and thus the present disclosure is not limited to the illustrated details. Like reference numerals refer to like elements throughout. In the following description, when the detailed description of the relevant known technology is determined to unnecessarily obscure the important point of the present disclosure, the detailed description will be omitted.

In describing a positional relationship, for example, when a position relation between two parts is described as 'on~', 'over~', 'under~', and 'next~', one or more other parts may be disposed between the two parts unless 'just' or 'direct' is used.

In describing a temporal relationship, when the temporal order is described as, for example, "after," "subsequent," "next," "before," "preceding," "prior to," or the like, a case that is not consecutive or not sequential may be included and thus one or more other events may occur therebetween, unless a more limiting term, such as "just," "immediate(ly)," or "direct(ly)," is used.

Hereinafter, with reference to the accompanying drawings, one or more embodiments of a source driver integrated circuit and a display driving device including the same according to the present disclosure will be described.

Figure 3:
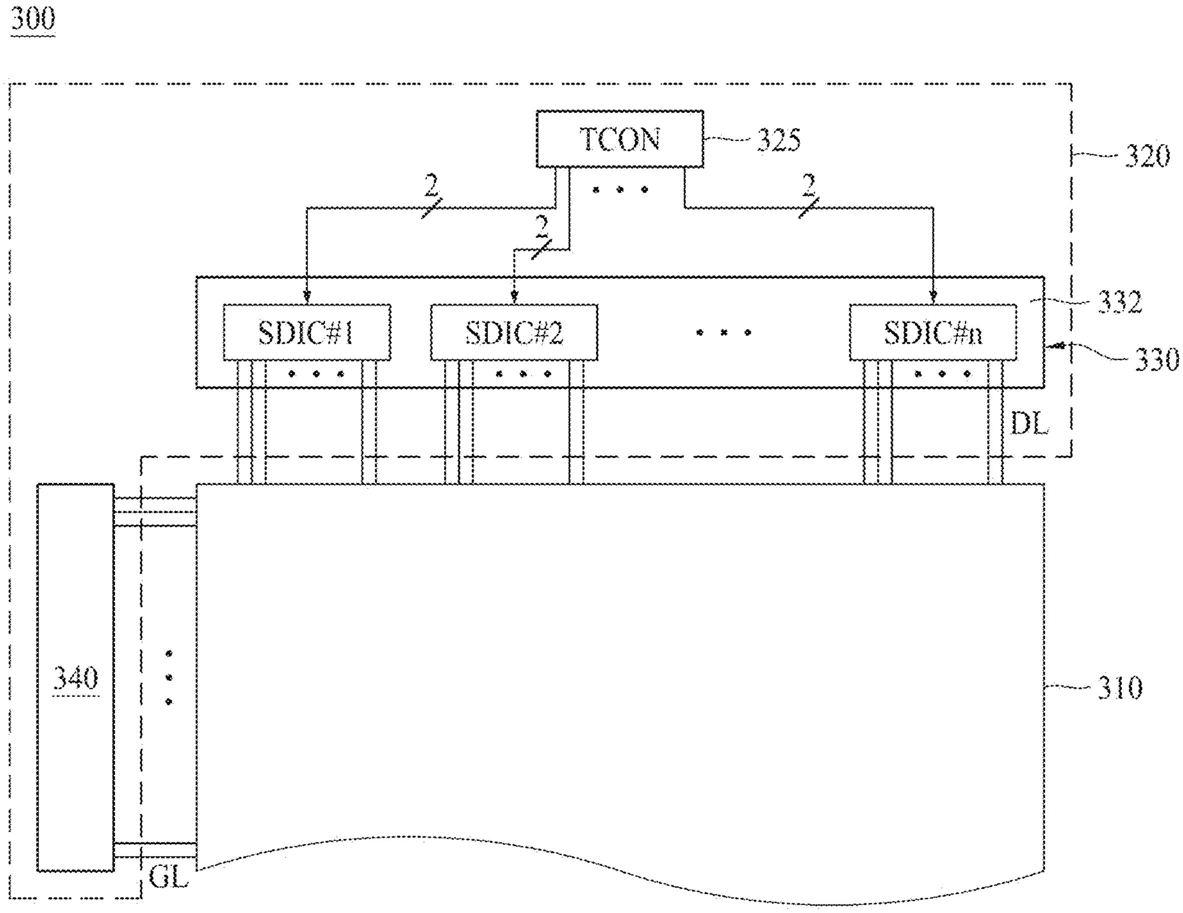
FIG. 3 schematically illustrates a display device to which a display driving device according to one exemplary embodiment of the present disclosure is applied.

FIG. 3 schematically illustrates a display device to which a display driving device according to one exemplary embodiment of the present disclosure is applied.

As illustrated in FIG. 3, a display device 300 according to one exemplary embodiment of the present disclosure includes a display panel 310 and a display driving device 320. The display driving device 320 includes a timing controller 325, a data driving unit 330, and a gate driving unit 340.

The display device 300 can be a TV, a monitor, or a mobile device. The mobile device can be a laptop computer, a tablet PC, a smartphone, a drone, or a wearable device.

The display panel 310 displays an image based on a scan signal transmitted from the gate driving unit 340 through a plurality of gate lines GL and a data voltage transmitted from the data driving unit 330 through a plurality of data lines DL.

The display panel 310 can be various types of display panels such as a liquid crystal display (LCD) panel, an organic light emitting display (OLED) panel, or a plasma display panel (PDP).

When the display panel 310 is the liquid crystal display panel, the display panel 310 includes a liquid crystal layer formed between two substrates and can be operated in TN (Twisted Nematic) mode, VA (Vertical Alignment) mode, IPS (In Plane Switching) mode, FFS (Fringe Field Switching) mode, etc.

When the display panel 310 is the organic light emitting display panel, the display panel 310 can be implemented in a top emission type, a bottom emission type, or a dual emission typed.

The display panel 310 can have a plurality of pixels arranged in a matrix form, and each pixel can include subpixels of different colors, for example, red subpixel, green subpixel, and blue subpixel. Each pixel can be defined by the plurality of data lines DL and the plurality of gate lines GL. In another embodiment, each pixel can further include a white subpixel.

The subpixel can include a thin film transistor TFT formed in an area where a data line DL and a gate line GL intersect, a light emitting device such as an organic light emitting diode OLED, and a storage capacitor that is electrically connected to the light emitting device to maintain the voltage.

The timing controller 325 controls the gate driving unit 340 and the data driving unit 330. The timing controller 325 generates gate control data for controlling the operation timing of the gate driving unit 340 and source control data for controlling the operation timing of the data driving unit 330 based on timing signals output from a host system (or an application processor: AP). The timing signals can include a vertical synchronization signal, a horizontal synchronization signal, a clock signal, and a data enable signal.

Additionally, the timing controller 325 generates an input data packet using the source control data and digital image data DATA and transmits the generated input data packet to the data driving unit 330.

The gate driving unit 340 sequentially supplies scan signals to the display panel 310 through the plurality of gate lines GL based on the gate control data generated by the timing controller 325, thereby sequentially driving the plurality of gate lines GL. To this end, the gate driving unit 340 can include a plurality of gate driver ICs (GDICs).

In one embodiment, the plurality of gate driver ICs constituting the gate driving unit 340 can be positioned on only one side of the display panel 310 or on both sides of the display panel 310, depending on a driving method. In another embodiment, the gate driving unit 340 can be built into a bezel area of the display panel 310 and implemented in the form of a GIP (Gate In Panel).

The data driving unit 330 receives the input data packet from the timing controller 325, restores digital image data from the input data packet to convert it into analog data voltage, and supplies the analog data voltage to the plurality of data lines DL, thereby driving pixel connected to each data line DL.

Specifically, when a specific gate line GL is turned on by the gate driving unit 340, the data driving unit 330 converts digital image data DATA received from the timing controller 325 into the analog data voltage and supplies it to each data line DL.

The data driving unit 330 can be located only on the upper or lower portion of the display panel 310, or can be located on both the upper and lower portions of the display panel 310 depending on the driving method or design rule.

The data driving unit 340 can include a plurality of source driver ICs SDIC #1 to SDIC #n. In one embodiment, the source driver ICs SDIC #1 to SDIC #n can be connected to bonding pads of the display panel 310 by a Tape Automated Bonding TAP type or a Chip On Glass COG type or can be directly disposed on the display panel 310. In another embodiment, the source driver ICs SDIC #1 to SDIC #n can be integrated and disposed on the display panel 310.

In addition, the source driver ICs SDIC #1 to SDIC #n can be implemented in a Chip On Film COF type. In this embodiment, each source driver IC SDIC #1 to SDIC #n is mounted on a flexible circuit film and can be attached to a source printed circuit board 332 through the flexible circuit film and electrically connected to the data line DL of the display panel 310. The flexible circuit film can be attached to the display panel 310 in a tape automated bonding TAB type using an anisotropic conductive film, and thus, the source driver ICs SDIC #1 to SDIC #n can be connected to the plurality of data lines DL.

The source printed circuit board 332 can be a flexible printed circuit board or a printed circuit board and can be connected to the flexible circuit film through a connector.

In one embodiment, each source driver IC SDIC #1 to SDIC #n is connected to the timing controller 325 in a point-to-point type to receive the input data packet from the timing controller 325. In this embodiment, each source driver IC SDIC #1 to SDIC #n can receive the input data packet from the timing controller 325 through a pair of data wires.

Hereinafter, the configuration of the source driver IC as described above will be described in more detail with reference to FIG. 4.

Figure 4:
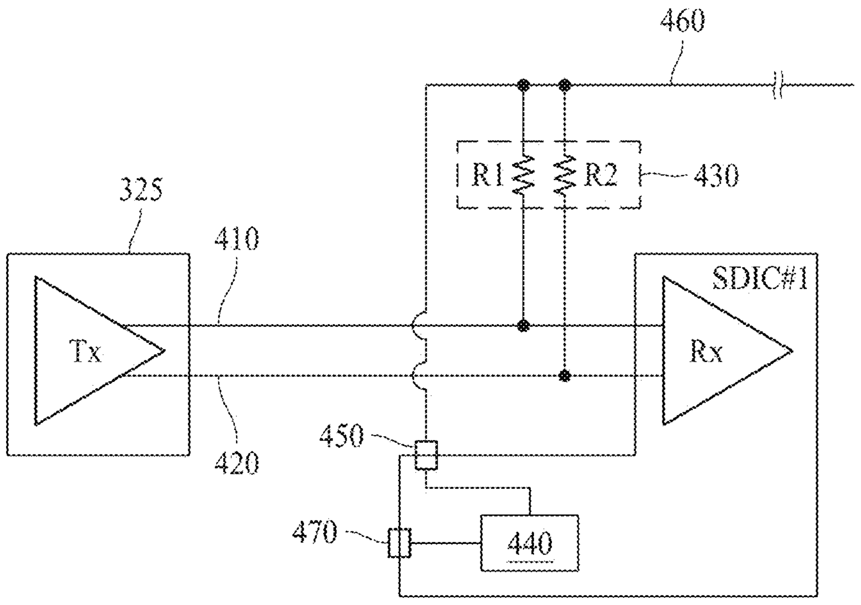
FIG. 4 schematically illustrates the configuration of a source driver IC according to one exemplary embodiment of the present disclosure.

FIG. 4 schematically illustrates the configuration of a source driver IC according to one exemplary embodiment of the present disclosure. According to one exemplary embodiment of the present disclosure, as illustrated in FIG. 4, the source driver ICs SDIC #1 to SDIC #n can receive the input data packet DATA from the timing controller 325 based on current mode logic CML. To this end, the source driver ICs SDIC #1 to SDIC #n can include a receiving-side comparator RX for receiving the input data packet.

The receiving-side comparator RX is connected to the transmitting-side comparator TX included in the timing controller 325 through the pair of data wires 410 and 420, that is, the first data wire 410 and the second data wire 420, to receive the input data packet.

According to this embodiment, a termination resistor circuit 430 for impedance matching can be mounted on an input side of a receiving-side comparator RX on the source printed circuit board 332. The termination resistor circuit 430 includes a first termination resistor R1 connected to the first data wire 410 and a second termination resistor R2 connected to the second data wire 420.

In particular, as illustrated in FIG. 4, the source driver ICs SDIC #1 to SDIC #n according to the present disclosure include a termination voltage generation circuit 440. The termination voltage generation circuit 440 generates a termination voltage that is applied to the termination resistance circuit 430. That is, the source driver ICs SDIC #1 to SDIC #n according to the present disclosure do not receive the termination voltage from a power supply, but directly generate the termination voltage internally and apply the generated termination voltage to the termination resistance circuit 430 of the corresponding source driver IC SDIC #1 to SDIC #n.

Each termination voltage generation circuit 440 included in the source driver ICs SDIC #1 to SDIC #n can generate and output the termination voltage at a predetermined time point. In one exemplary embodiment, each termination voltage generation circuit 440 included in the source driver ICs SDIC #1 to SDIC #n can generate the termination voltage when the input data packet is received from the timing controller 325. For example, the timing controller 325 generates the input data packet including an enable signal for generating the termination voltage and transmits the input data packet to each source driver IC SDIC #1 to SDIC #n. Each termination voltage generation circuit 440 included in the source driver ICs SDIC #1 to SDIC #n can generate the termination voltage when the enable signal is changed from a first logic level to a second logic level.

According to the present disclosure, since each source driver IC SDIC #1 to SDIC #n does not receive the termination voltage from the power supply but directly generates the termination voltage internally, a voltage drop (IR Drop) due to the separation distance between the power supply and the source driver IC SDIC #1 to SDIC #n does not occur.

Hereinafter, the termination voltage generation circuit 440 according to one exemplary embodiment of the present disclosure will be specifically described with reference to FIGS. 5 and 6.

Figure 5:
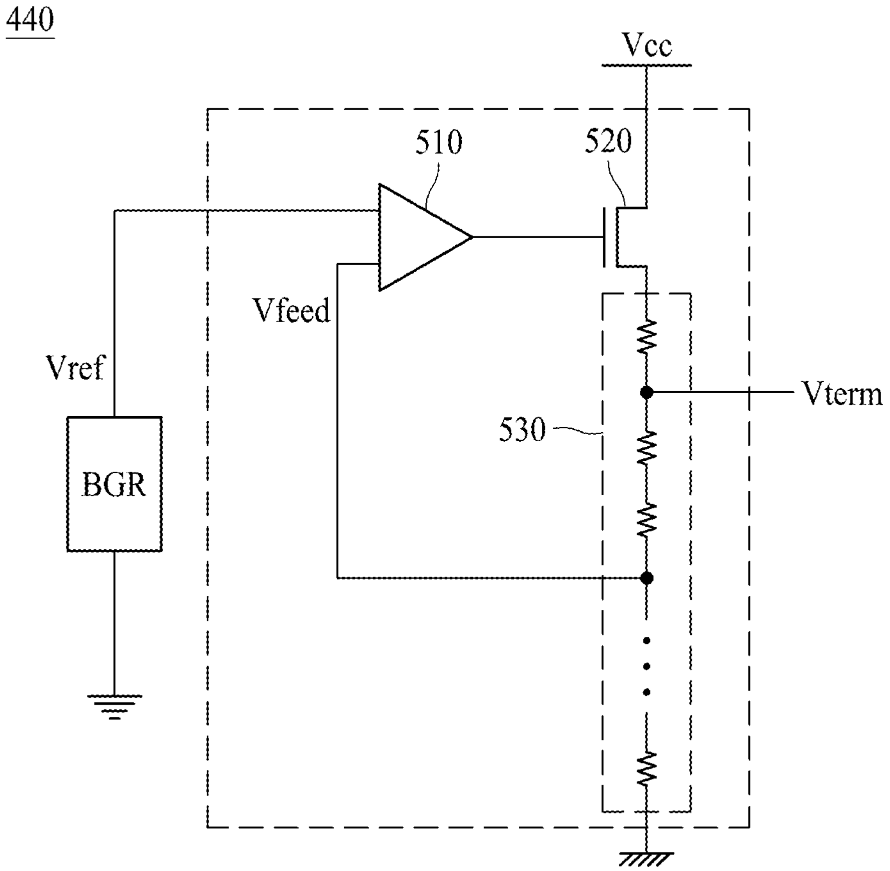
FIG. 5 is a circuit diagram illustrating the configuration of a termination voltage generation circuit according to one exemplary embodiment of the present disclosure.

FIG. 5 is a circuit diagram illustrating the configuration of a termination voltage generation circuit according to one exemplary embodiment of the present disclosure. As illustrated in FIG. 5, the termination voltage generation circuit 440 according to one exemplary embodiment of the present disclosure includes an amplifier 510, a transistor 520, and a voltage divider circuit 530. As described above, the termination voltage generation circuit 440 can initiate the termination voltage generation operation when the enable signal included in the input data packet changes from the first logic level to the second logic level.

The amplifier 510 compares a reference voltage Vref and a feedback voltage Vfeed, amplifies the difference between the reference voltage Vref and the feedback voltage Vfeed, and outputs an amplified value to a gate terminal of the transistor 520. Specifically, the reference voltage Vref is input to a first input terminal of the amplifier 510, the feedback voltage Vfeed is input to a second input terminal of the amplifier 510, and the amplified value of the difference between the reference voltage Vref and the feedback voltage Vfeed is output to an output terminal of the amplifier 510. In one embodiment, the amplifier 510 can be implemented as a unit gain amplifier.

In this embodiment, the amplifier 510 amplifies the difference between the reference voltage Vref and the feedback voltage Vfeed fed back from the voltage divider circuit 530, and the termination voltage Vterm can be adjusted according to the amplified value, thereby enabling precise control of the termination voltage Vterm.

In one embodiment, the reference voltage Vref input to the amplifier 510 can be generated by a band gap reference circuit (BGR). To this end, the source driver IC SDIC #1 to SDIC #n can further include a band gap reference circuit. The band gap reference circuit can generate a temperature-independent reference voltage Vref and input it to the amplifier 510.

Meanwhile, the termination voltage generation circuit 440 according to one exemplary embodiment of the present disclosure can vary the termination voltage Vterm by varying the voltage level of the reference voltage Vref input to the amplifier 510. In this embodiment, the reference voltage Vref can be varied according to a reference voltage variation command. The reference voltage variation command can be included in the source control data of the input data packet. To this end, when variation of the termination voltage Vterm is required, the timing controller 325 can generate the input data packet by including the reference voltage variation command in the source control data included in the input data packet.

In one embodiment, the termination voltage generation circuit 440 can vary the reference voltage Vref by using a circuit element such as a switching regulator. According to this embodiment, when the voltage level of the reference voltage Vref input to the amplifier 510 is changed, the current flowing through the transistor 520 and the voltage divider circuit 530 is varied, so that the level of the termination voltage Vterm output from the voltage divider circuit 530 can be varied.

The transistor 520 has a first terminal, a second terminal, and a third terminal. The first terminal of the transistor 520 is connected to the output terminal of the amplifier 510. The second terminal of the transistor 520 is connected to a node in which a first power supply voltage Vcc is applied, and thus, the first power supply voltage Vcc is applied to the second terminal of the transistor 520. The third terminal of the transistor 520 is connected to the voltage divider circuit 530.

In one embodiment, the first power supply voltage Vcc can be generated by a Power Management Integrated Circuit PMIC and supplied to the node through a power supply voltage input port 470 of the source driver IC SDIC #1 to SDIC #n as illustrated in FIG. 4. In addition, the transistor 520 can be implemented as an N-type MOSFET.

According to this embodiment, when the voltage output from the amplifier 510 is applied to the first terminal of the transistor 520, the transistor 520 is turned on so that the current by the first power supply voltage Vcc flows through the transistor 520 to the voltage divider circuit 530.

The voltage divider circuit 530 divides a first power supply voltage Vcc using a resistor string in which a plurality of resistors are connected in series, and outputs the termination voltage Vterm and the feedback voltage Vfeed. The voltage level of the termination voltage Vterm can be lower than the voltage level of the first power supply voltage Vcc. One end of the resistor string included in the voltage divider circuit 530 is connected to the third terminal of the transistor 520, and the other end of the resistor string is connected to a ground terminal. The termination voltage Vterm is output from a tap connected to one of the nodes between the resistors constituting the resistor string, and the feedback voltage Vfeed is output from a tap connected to the other of the nodes between the resistors constituting the resistor string.

Figure 6:
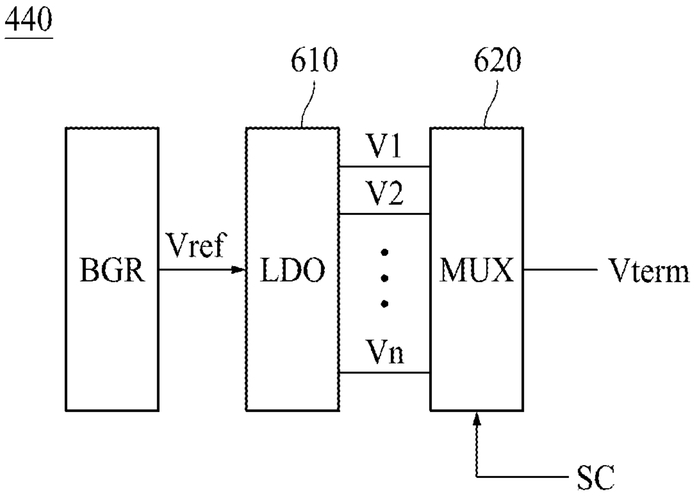
FIG. 6 is a circuit diagram illustrating the configuration of a termination voltage generation circuit according to another exemplary embodiment of the present disclosure.

FIG. 6 is a circuit diagram illustrating the configuration of a terminal voltage generation circuit according to another exemplary embodiment of the present disclosure. As illustrated in FIG. 6, the termination voltage generation circuit 440 according to another exemplary embodiment of the present disclosure includes an LDO regulator 610 and a multiplexer 620.

The LDO (Low Drop Out) regulator 610 generates a plurality of output voltages V1 to Vn having different voltage levels by using the reference voltage Vref when the reference voltage Vref is input. In one embodiment, the reference voltage Vref input to the LDO regulator 610 can be generated by the band gap reference circuit (BGR). For this purpose, the source driver IC SDIC #1 to SDIC #n can further include the band gap reference circuit. The band gap reference circuit can generate a temperature-independent reference voltage Vref and input it to the LDO regulator 610.

The multiplexer 620 selects one of the plurality of output voltages V1 to Vn generated by the LDO regulator 610 and outputs it as the termination voltage Vterm. A selection command SC for selecting the termination voltage among the plurality of output voltages V1 to Vn can be received by being included in the source control data included in the input data packet. To this end, the timing controller 325 can generate the selection command SC indicating one output voltage to be selected as the termination voltage Vterm among the plurality of output voltages V1 to Vn and include it in the source control data. The multiplexer 620 outputs the output voltage corresponding to the selection command SC included in the source control data among the plurality of output voltages V1 to Vn as the termination voltage Vterm.

Referring again to FIG. 4, the termination resistor circuit 430 of each source driver IC SDIC #1 to SDIC #n is not mounted inside the source driver IC SDIC #1 to SDIC #n, but is mounted outside the source driver IC SDIC #1 to SDIC #n on the source printed circuit board 332. Therefore, the data driving unit 330 according to the present disclosure can further include a termination voltage output port 450 for externally transmitting the termination voltage Vterm generated inside the source driver IC SDIC #1 to SDIC #n in order to apply the termination voltage Vterm to the termination resistor circuit 430 located outside the source driver IC SDIC #1 to SDIC #n.

That is, the termination voltage generation circuit 440 of each source driver IC SDIC #1 to SDIC #n generates the termination voltage Vterm and applies the generated termination voltage Vterm to the termination resistance circuit 430 through the termination voltage output port 450.

Meanwhile, the termination voltages Vterm generated by the termination voltage generation circuit 440 of each source driver IC SDIC #1 to SDIC #n can have deviations due to an offset of the termination voltage generation circuit 440 included in each source driver IC SDIC #1 to SDIC #n. Therefore, as illustrated in FIG. 4, the data driving unit 330 according to the present disclosure can further include a termination voltage equalization wire 460 for equalizing the termination voltages Vterm generated by each source driver IC SDIC #1 to SDIC #n, The termination voltage equalization wire 460 is mounted on the source printed circuit board 332 to equalize the termination voltages (Vterm) generated by each source driver IC SDIC #1 to SDIC #n and apply it to the termination resistance circuit 430 of each source driver IC SDIC #1 to SDIC #n.

Figure 7:
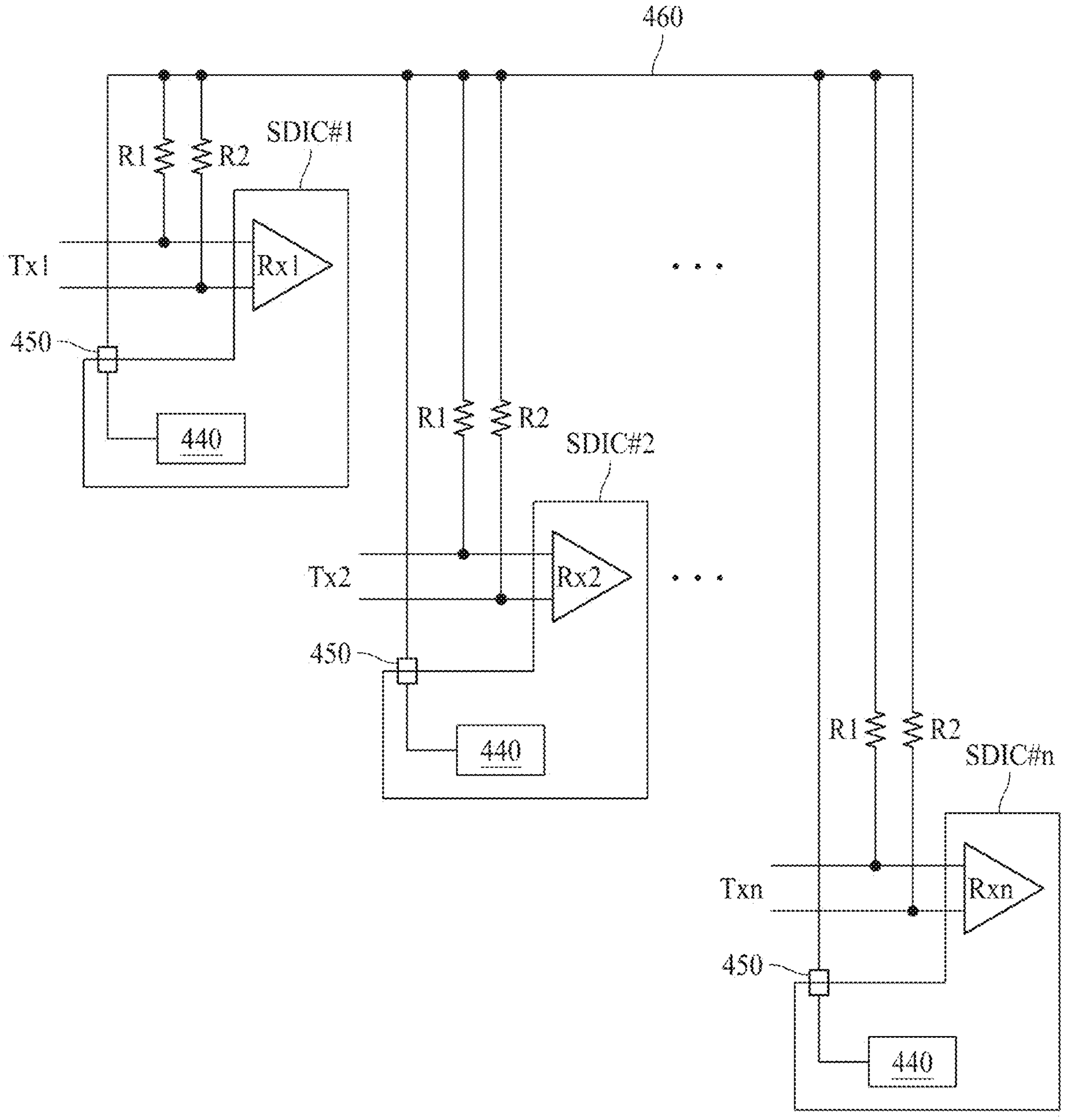
FIG. 7 illustrates an example of a termination voltage equalization wire electrically connecting termination voltage output ports of each source driver ICs according to one exemplary embodiment of the present disclosure.

Specifically, as illustrated in FIG. 7, the termination voltage equalization wire 460 according to one exemplary embodiment of the present disclosure electrically connects the termination voltage output ports 450 of each source driver IC SDIC #1 to SDIC #n to each other. In this embodiment, one end of the first resistor R1 included in the termination resistance circuit 430 of each source driver IC SDIC #1 to SDIC #n is connected to the termination voltage equalization wire 460, and the other end of the first resistor R1 is connected to the first data wire 410. In addition, one end of the second resistor R2 included in the termination resistance circuit 430 of each source driver IC SDIC #1 to SDIC #n is connected to the termination voltage equalization wire 460, and the other end of the second resistor R2 is connected to the second data wire 420.

In this way, according to the present disclosure, since each source driver IC SDIC #1 to SDIC #n can directly generate the termination voltage Vterm through the termination voltage generation circuit 440, a voltage drop due to a distance between the source driver IC SDIC #1 to SDIC #n and the power supply cannot occur, and thus, occurrence of termination voltage deviation due to the position of each source driver IC SDIC #1 to SDIC #n can be prevented. In addition, since the termination voltage Vterm generated by each source driver IC SDIC #1 to SDIC #n is equalized through the termination voltage equalization wire 460 to apply it to the termination resistance circuit 430 of each source driver IC SDIC #1 to SDIC #n, occurrence of termination voltage deviation due to an offset of the termination voltage generation circuit 440 can also be prevented.

Meanwhile, although not shown in FIG. 4, the source driver ICs SDIC #1 to SDIC #n can further include a clock recovery circuit and a data recovery circuit not shown. The clock recovery circuit generates a clock signal by recovering a clock included in the input data packet received from the timing controller 325 through the first and second data wires 410 and 420 based on a preset protocol. In addition, the data recovery circuit can recover image data and control data included in the input data packet based on the recovered clock signal.

Additionally, the source driver ICs SDIC #1 to SDIC #n can further include a shift register, a latch circuit, a digital to analog converter (DAC), and an output buffer for processing image data.

In the present disclosure, since each source driver IC does not receive the termination voltage from the power supply but has a separate termination voltage generation circuit built in that can generate the termination voltage, thereby preventing the occurrence of a voltage drop of the termination voltage due to the distance between the source driver IC and the power supply.

Moreover, in the present disclosure, since the termination voltages generated by each source driver IC can be equalized and applied to the termination resistances of each source driver IC, thereby preventing occurrence of a deviation in the termination voltage due to an offset in the termination voltage generation circuit of each source driver IC.

Moreover, in the present disclosure, since the occurrence of deviation in the termination voltage applied to the termination resistances of each source driver IC is prevented and all source driver ICs can operate with the same termination voltage, thereby preventing the occurrence of image defects due to the deviation in the termination voltage.

Moreover, in the present disclosure, since the circuit components for generating the termination voltage and the circuit components for transmitting the termination voltage from the power supply to the source driver IC can be eliminated in the power supply, the hardware configuration of the display driving device can be simplified, and the manufacturing cost of the display driving device can be reduced.

Embodiments of the present disclosure have been described in more detail with reference to the accompanying drawings, but the present disclosure is not necessarily limited to these embodiments and can be modified in various ways without departing from the technical sprit of the present disclosure.

Accordingly, the embodiments disclosed herein are intended to illustrate and not to limit the technical sprit of the present disclosure, and the scope of the technical sprit of the present disclosure is not limited by these embodiments. Therefore, it should be understood that the above-described embodiments are exemplary in all respects and not limited. The scope of protection of the present disclosure shall be construed by the claims, and all technical sprit within the equivalent scope of the claims should be construed to be included within the scope of the present disclosure.

What is claimed is:

1. A display driving device comprising:

a timing controller configured to output an input data packet including image data and source control data;

a plurality of source driver integrated circuits configured to be connected to the timing controller in a point-to-point type through a first data wire and a second data wire to receive the input data packet, and configured to generate a termination voltage using a reference voltage and a first power supply voltage to output the termination voltage through a termination voltage output port, respectively;

a plurality of termination resistor circuits configured to connect the first data wire and the second data wire of each of the source driver integrated circuits to each other; and a termination voltage equalization wire configured to electrically connect termination voltage output ports of the plurality of source driver integrated circuits to each other to equalize the termination voltage generated by each of the source driver integrated circuits and apply the equalized termination voltage to each of the termination resistor circuits.

2. The display driving device of claim 1, wherein each of the plurality of source driver integrated circuits comprises a termination voltage generation circuit configured to generate the termination voltage, and wherein the termination voltage generation circuit comprises:

an amplifier configured to compare the reference voltage generated by a band gap reference (BGR) circuit with a feedback voltage and amplify a difference;

a voltage divider circuit configured to divide the first power supply voltage and output the termination voltage and the feedback voltage; and a transistor having a first terminal connected to an output terminal of the amplifier, a second terminal to which the first power supply voltage is applied, and a third terminal connected to the voltage divider circuit.

3. The display driving device of claim 1, wherein each of the plurality of source driver integrated circuits comprises a termination voltage generation circuit configured to generate the termination voltage, and wherein the termination voltage generation circuit comprises:

an LDO (Low Drop Out) regulator configured to generate a plurality of output voltages having different voltage levels using the reference voltage generated by a band gap reference circuit; and a multiplexer configured to be connected to an output terminal of the LDO regulator and output one of the plurality of output voltages as the termination voltage according to a selection command included in the source control data.

4. The display driving device of claim 1, wherein the reference voltage is varied in voltage level according to a reference voltage variation command included in the source control data.

5. The display driving device of claim 1, wherein each of the plurality of termination resistor circuits comprises:

a first termination resistor formed on a source printed circuit board on which the plurality of source driver integrated circuits are mounted, the first termination resistor having one end connected to the termination voltage equalization wire and another end connected to the first data wire; and a second termination resistor formed on the source printed circuit board, the second termination resistor having one end connected to the termination voltage equalization wire and another end connected to the second data wire.

6. A source driver integrated circuit comprising:

a receiving-side comparator configured to receive an input data packet including image data and source control data from a transmitting-side comparator via a first data wire and a second data wire;

a termination voltage generation circuit configured to generate a termination voltage using a reference voltage and a first power supply voltage; and a termination voltage output port configured to output the termination voltage to a termination resistor circuit connected to the first data wire and the second data wire, wherein the reference voltage is varied in voltage level according to a reference voltage variation command included in the source control data.

7. The source driver integrated circuit of claim 6, wherein the termination voltage output port is electrically connected to a termination voltage output port of another source driver integrated circuit adjacent to the source driver integrated circuit through a termination voltage equalization wire, and wherein the termination voltage equalized by the termination voltage equalization wire is applied to the termination resistor circuit.

8. The source driver integrated circuit of claim 6, wherein the termination resistor circuit comprises:

a first termination resistor formed on a source printed circuit board on which the source driver integrated circuit is mounted, the first termination resistor having one end connected to a termination voltage equalization wire and another end connected to the first data wire; and a second termination resistor formed on the source printed circuit board, the second termination resistor having one end connected to the termination voltage equalization wire and another end connected to the second data wire.

9. The source driver integrated circuit of claim 6, further comprising a band gap reference circuit for generating the reference voltage, wherein the termination voltage generation circuit comprises:

an amplifier configured to compare the reference voltage with a feedback voltage and amplify a difference;

a voltage divider circuit configured to divide the first power supply voltage and output the termination voltage and the feedback voltage; and a transistor having a first terminal connected to an output terminal of the amplifier, a second terminal to which the first power supply voltage is applied, and a third terminal connected to the voltage divider circuit.

10. The source driver integrated circuit of claim 9, wherein the voltage divider circuit comprises a resistor string in which a plurality of resistors are connected in series, wherein the termination voltage is output from a tap connected to one of nodes between the resistors included in the resistor string, and wherein the feedback voltage is output from a tap connected to another of the nodes between the resistors included in the resistor string.

11. The source driver integrated circuit of claim 6, wherein the termination voltage generation circuit comprises:

an LDO regulator configured to generate a plurality of output voltages having different voltage levels using the reference voltage; and a multiplexer configured to be connected to an output terminal of the LDO regulator and output one of the plurality of output voltages as the termination voltage according to a selection command included in the source control data.

* * * * *